(12) United States Patent
Howerton

(10) Patent No.: US 11,513,834 B1
(45) Date of Patent: Nov. 29, 2022

(54) CREATING A LAYERED MULTI-TENANT ARCHITECTURE

(71) Applicant: Regscale, Tysons, VA (US)

(72) Inventor: Jared Travis Howerton, Oak Ridge, TN (US)

(73) Assignee: Regscale, Tysons, VA (US)

( * ) Notice: Subject to any disclaimer, the term of this patent is extended or adjusted under 35 U.S.C. 154(b) by 0 days.

(21) Appl. No.: 17/746,394

(22) Filed: May 17, 2022

(51) Int. Cl.
  *G06F 9/455* (2018.01)
  *G06F 9/50* (2006.01)
  *G06F 9/54* (2006.01)
  *G06F 11/34* (2006.01)

(52) U.S. Cl.
  CPC ........ *G06F 9/45558* (2013.01); *G06F 9/5077* (2013.01); *G06F 9/547* (2013.01); *G06F 11/3409* (2013.01); *G06F 2009/4557* (2013.01)

(58) Field of Classification Search
  CPC .... G06F 9/45558; G06F 9/5077; G06F 9/547; G06F 11/3409; G06F 2009/4557
  See application file for complete search history.

(56) References Cited

U.S. PATENT DOCUMENTS

| | | | |
|---|---|---|---|
| 2016/0065618 A1* | 3/2016 | Banerjee | G06F 9/5077 726/1 |
| 2017/0063833 A1* | 3/2017 | Colle | G06F 8/60 |
| 2018/0137296 A1* | 5/2018 | Cahana | G06F 21/629 |
| 2018/0375728 A1* | 12/2018 | Gangil | H04L 41/0853 |
| 2020/0262063 A1* | 8/2020 | Perera | B25J 9/1661 |
| 2020/0356397 A1* | 11/2020 | Kumatagi | G06F 9/455 |

OTHER PUBLICATIONS

Reinhard Frank, Matthias Scheffel, Florian Zeiger, Hans-Peter Huth, "Enabling MultiTenant Networks for the Automation Industry", 2019 International Conference on Networked Systems (NetSys), (Year: 2019).*

* cited by examiner

*Primary Examiner* — Jacob D Dascomb
(74) *Attorney, Agent, or Firm* — Shumaker, Loop & Kendrick, LLP

(57) ABSTRACT

Disclosed is a system and a method for creating a layered and portable multi-tenant architecture. Initially, a cloud container for a platform is created. The cloud container includes a namespace for a tenant accessing the platform. Further, a logical isolation for the namespace of the tenant is created. Subsequently, a plurality of tenants in the namespace is generated based on the logical isolation. The tenant is further allowed to access a tenant database via Application Programming Interfaces (APIs), thereby creating a layered multi-tenant architecture.

9 Claims, 3 Drawing Sheets

CREATING A LAYERED MULTI-TENANT ARCHITECTURE

TECHNICAL FIELD

The present subject matter described herein, in general, relates to a system and a method for creating a portable and layered multi-tenant architecture.

BACKGROUND

Typically, multi-tenant is a software architecture that comprises a plurality of different users and a plurality of groups of different users who share one basic resource pool including software and hardware resources. Further, a multi-tenant system is necessary for a cloud computing data center network. It must be noted that many highly regulated customers desire the benefits of cloud for scalability and ease of management. However, the customers may face difficulty due to business model i.e., lack of OPEX budgets, security concerns, regulatory restraints, and technical feasibility or classified or air-gapped Operational Technology (OT) networks. Further, the traditional multi-tenant system creates one tenant for one customer. It is not possible to create multiple tenants for one customer essentially multi-tenancy squared in the traditional multi-tenant system. This is because, creation of the multiple tenants is a complex process.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for creating a layered multi-tenant architecture. This summary is not intended to identify essential features of the claimed subject matter nor is it intended for use in determining or limiting the scope of the claimed subject matter.

In one implementation, a method for creating a layered multi-tenant architecture is disclosed. Initially, a cloud container for a platform may be created. The cloud container may comprise a namespace for a tenant from a set of tenants accessing the platform. The namespace may be created using a Container as a Service (CaaS) platform. The namespace may indicate a first layer isolation for the set of tenants. Further, a logical isolation for the namespace of the tenant may be created. The logical isolation may be at a database layer. The logical isolation may be a n-to-n segregation of the namespace. Furthermore, a plurality of tenants in the namespace based on the logical isolation may be generated. The plurality of tenants may be generated based on business units in the platform. Finally, the tenant may be allowed to access a tenant database via Application Programming Interfaces (APIs). The access may be performed using a web token. The web token may comprise a customer identity and a customer role. The APIs may parse the web token to validate each tenant from the set of tenants, thereby creating a layered multi-tenant.

In another implementation, a non-transitory computer program product having embodied thereon a computer program for creating a layered multi-tenant architecture is disclosed. The program may comprise a program code for creating a cloud container for a platform. The cloud container may comprise a namespace for a tenant from a set of tenants accessing the platform. The namespace may be created using a Container as a Service (CaaS) platform. The namespace may indicate a first layer isolation for the set of tenants. Further, the program may comprise a program code for creating a logical isolation for the namespace of the tenant. The logical isolation may be at a database layer. The logical isolation may be a n-to-n segregation of the namespace. Furthermore, the program may comprise a program code for generating a plurality of tenants in the namespace based on the logical isolation. The plurality of tenants may be generated based on business units in the platform. Finally, the program may comprise a program code for allowing the tenant to access a tenant database via Application Programming Interfaces (APIs). The access may be performed using a web token. The web token may comprise a customer identity and a customer role. The APIs may parse the web token to validate each tenant from the set of tenants, thereby creating a layered multi-tenant.

BRIEF DESCRIPTION OF THE DRAWINGS

The foregoing detailed description of embodiments is better understood when read in conjunction with the appended drawings. For the purpose of illustrating the present subject matter, an example is provided as figures, however, the invention is not limited to the specific method and system for creating a layered multi-tenant architecture is disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

Figure 1:
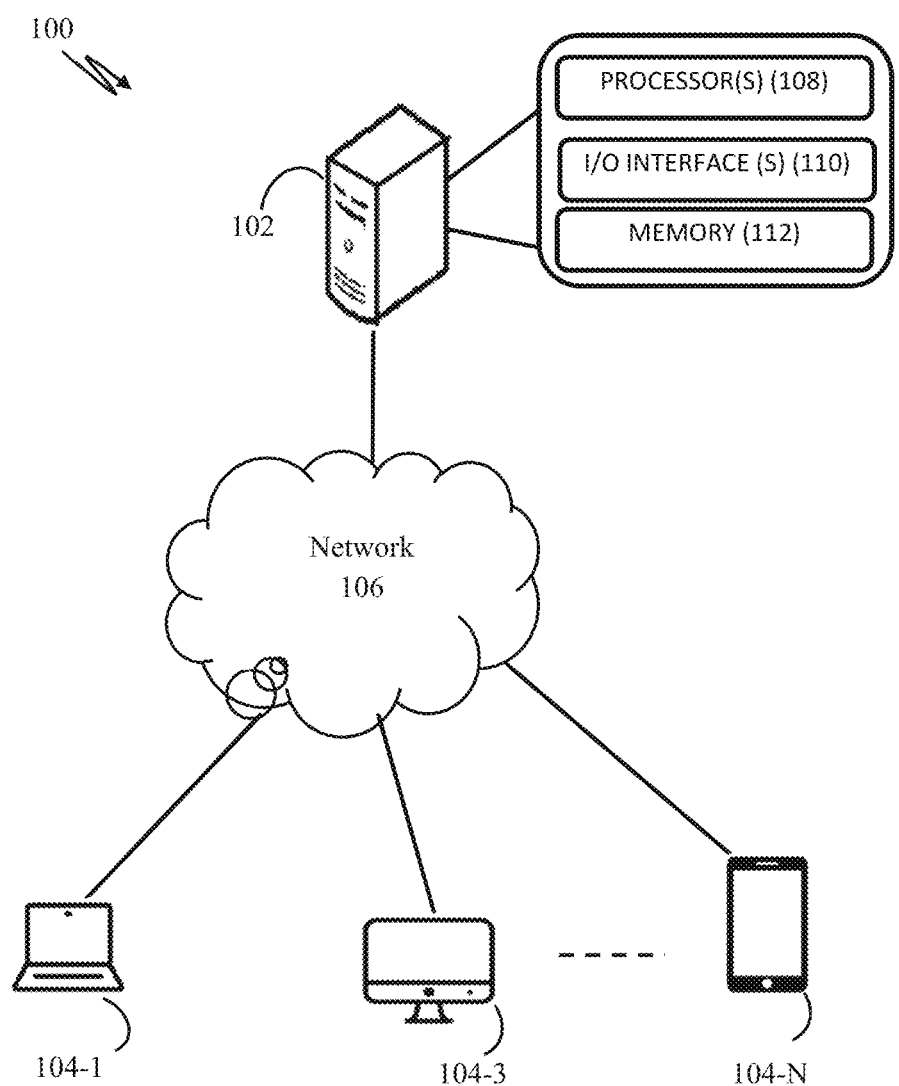
FIG. 1 illustrates a network implementation of a system for creating a layered multi-tenant architecture is disclosed, in accordance with an embodiment of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "creating", "generating," "allowing," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

The present subject matter discloses a system and a method for creating a layered multi-tenant architecture. Typically, a traditional SaaS platform may generate one tenant for each customer. This is because, it is complex to generate multiple tenants for each customer using the traditional SaaS platform. More importantly, the present invention discloses a portable and layered multi-tenant architecture. Initially, a namespace for a customer using a platform may be generated. Further, a second layer segregation of tenants may be created in the namespace. The customer may be allowed to access a tenant database using Application Programming Interfaces (APIs).

In one embodiment, the present invention may build a multi-tenant "cloud in a box" that is portable. In addition, each tenant may be referred as a single organization or a customer. However, an organization may comprise multiple groups that can be segregated as tenants for a single customer i.e., HR, Sales, Cyber Security, Internal Audit, etc. The present invention may generate n number of tenants per customer along with n number of customers layered multi-tenancy or multi-tenancy squared. Further, the present invention may create a second layer segregation of tenants.

While aspects of described system and method for creating a layered multi-tenant architecture may be implemented in any number of different computing systems, environments, and/or configurations, the embodiments are described in the context of the following exemplary system.

Referring now to FIG. 1, a network implementation 100 of a system 102 for creating a layered multi-tenant architecture is disclosed. It may be noted that one or more users may access the system 102 through one or more user devices 104-1, 104-2 . . . 104-N, collectively referred to as user devices 104, hereinafter, or applications residing on the user devices 104. In one aspect, the one or more users may comprise a doctor, a lab assistant, and the like.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are coupled to the system 102 for communications purposes through a network 106.

In one implementation, the network 106 may be a wireless network, a wired network, or a combination thereof. The network 106 can be implemented as one of the different types of networks, such as intranet, local area network (LAN), wide area network (WAN), the interne, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may include at least one processor 108, an input/output (I/O) interface 110, and a memory 112. Processors for 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a command line interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or nonvolatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for creating a layered multi-tenant architecture. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for creating a layered multi-tenant. The system 102 may create a cloud container for a platform. The cloud container may be built from instructions that dictate, compile and build instructions for the application and then package resulting binaries into an immutable container. In one aspect, the platform may be packaged into the cloud container for portability into any environment including air-gapped networks and on-premise data centers. The cloud container may comprise a plurality of elements required to run the platform in the environment including front-end user interface, middle tier business logic, and persistent data storage.

In one embodiment, the cloud container may comprise a namespace for a tenant from a set of tenants accessing the platform. The namespace may be created using a Container as a Service (CaaS) platform. The Container as a Service (CaaS) platform may be a Kubernetes platform or any environment capable of orchestrating containers at scale via namespaces. In one aspect, the namespace for the customer may be generated using the Kubernetes platform. The Kubernetes platform may automate a deployment and management of cloud native applications using on-premises infrastructure or public cloud platforms. The system 102 may comprise running multiple load-balanced instances within the Kubernetes platform.

In one aspect, the namespace may indicate a first layer isolation for the set of tenants. In one embodiment, the namespace may provide a mechanism for isolating a plurality of resources within a single cluster by creating a one to one mapping of customers to namespaces at the Kubernetes level which is defined using YAML files. The namespace may be used to divide the plurality of resources between the set of tenants. Each tenant may be able to run the namespace to provide an infrastructure layer isolation between the set of tenants to provide overall isolation of tenants to customers in a one to one relationship.

Subsequently, the system 102 may create a logical isolation for the namespace of the tenant. The logical isolation may be created at a database layer. The logical isolation may indicate a n-to-n segregation of the namespace. The logical isolation may be created based on a plurality of business units present in the platform. The logical isolation may allow a single customer to be split into another layer of multi-tenancy allowing business units for any customer to have logical isolation from one another within a single system.

Further, the system 102 may generate a plurality of tenants in the namespace. The plurality of tenants may be based on the logical isolation. The logical isolation may be achieved through sharding the database based on a tenant primary key and adding the primary key to each table and query of the database. Further, data may be accessed through the middle tier APIs that provides "to the n" isolation of tenants i.e., business units with a single customer i.e., namespace. In one aspect, the plurality of tenants may be generated based on the plurality of business units. In one example, the business units may comprise HR, environmental management, and cyber security. Further, the system 102 may generate at least one tenant for each business unit. In the example, the system 102 may generate the tenant for HR, the tenant for cyber security and the tenant for environmental management.

In one aspect, the plurality of tenants may be generated based customer information. The customer information may comprise a customer name, a customer department, one or more business units associated with the customer and the like. In one embodiment, the system 102 may comprise allowing an admin to create the plurality of tenants. In one embodiment, the system 102 may comprise rollup of metrics and Key Performance Indicators (KPIs) across the plurality of tenants by leveraging API calls for each tenant to aggregate data into business intelligence tools for corporate/organizational reporting. The system may provide complete isolation of business unit data while the schema consistency still allows for rollup of data in a consistent manner for enterprise reporting.

Once the plurality of tenants is created, the system 102 may allow the customer to access a tenant database via Application Programming Interfaces (APIs). The access may be performed using a web token. The web token may be a Javascript Object Notation (JSON) token. The web token may comprise a customer identity and a customer role. In one embodiment, the APIs may parse the web token to validate each tenant from the set of tenants. The web token may contain metadata for the user including a user ID and user's assigned roles for access control. For every API call, the user ID may be looked up on the server side to determine the correct tenant, then all data returned is isolated to that tenant for security reasons. Based on the validation, the system 102 may allow the customer to access the tenant database.

The tenant database may comprise the APIs, modules, configurations, integrations, and role based access control for the tenant. In one aspect, each tenant may be configured with the tenant, the APIs, modules, configurations, integrations, and role based access control for the tenant. In one embodiment, the system 102 may allow the tenant to access the tenant database based on the second layer of tenant isolation. In other embodiment, the system 102 may allow the user to access the tenant database based on the user role.

In one embodiment, the system 102 may comprise an additional layer i.e., the logical isolation of multi-tenancy. The additional layer may allow an advanced security segregation of data while simplifying a number of applications and infrastructure that the customer may manage. The data may be associated with an organization corresponding to the platform. Further, the system 102 may provide a portable architecture. The tenant may get advantages of a traditional Software as a service (SaaS) solution while being able to run on-premise or on an air-gapped network.

In one embodiment, the system 102 may combine multiple different solutions in a new way to solve the "n to n" complexity problem. The system 102 may comprise a portable architecture. In one aspect, the system 102 may comprise complicated components comprising building a stateless portable application, infrastructure isolation with namespace, and then a multi-tenant architecture inside the namespace. The system 102 may combine the components to allow access to a cloud-like compliance platform even on isolated networks by reducing the complexity of an infrastructure and app sprawl that a large organization would otherwise have to operate.

In one embodiment, an admin may sign in from an Global Admin account on the platform. The Global Admin may create the plurality of tenants. For each tenant, one or more "Administrator" roles may be assigned to each customer tenant allowing the customer to manage the plurality of tenants with user isolation.

Figure 2:
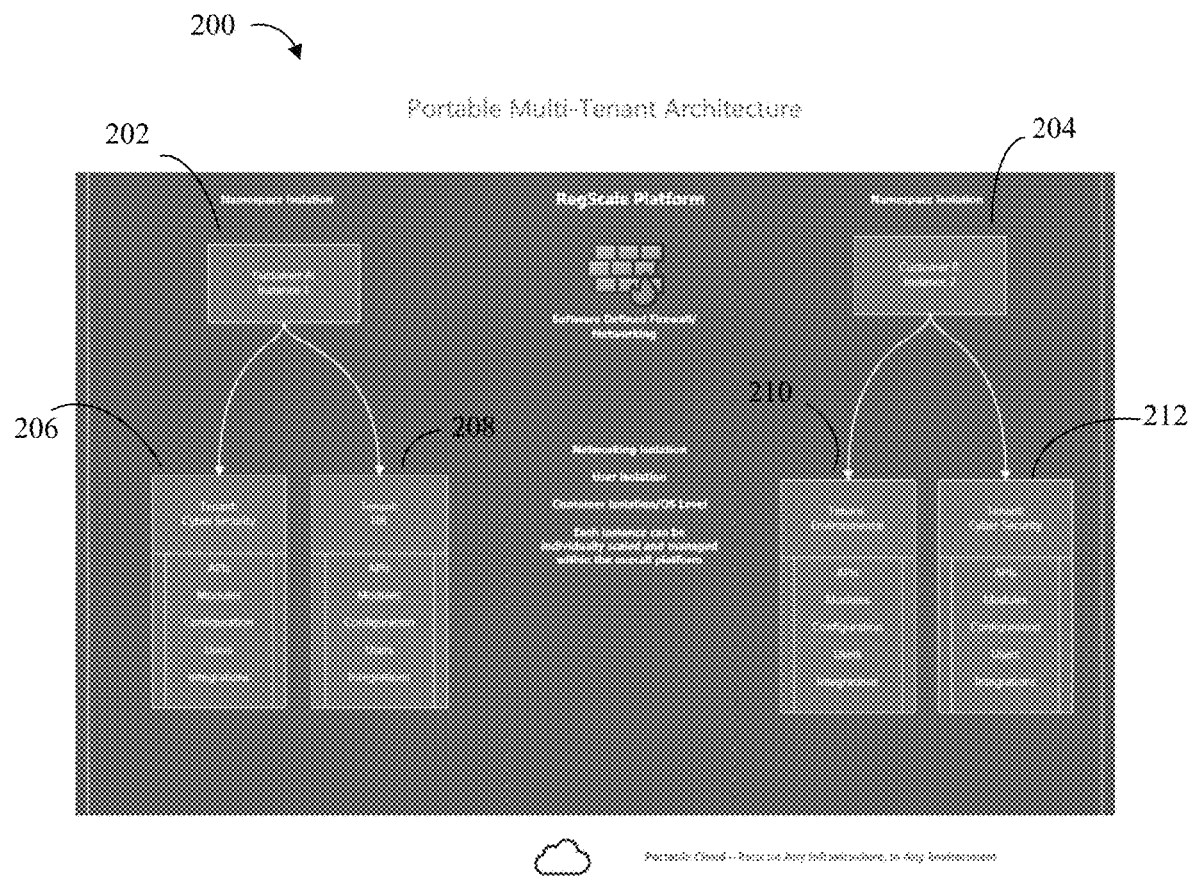
FIG. 2 illustrates an exemplary embodiment of the system for creating the layered multi-tenant, in accordance with an embodiment of the present subject matter.

Referring now to FIG. 2, an exemplary embodiment 200 of the system 102 for creating a layered multi-tenancy architecture is disclosed, in accordance with an embodiment of the present subject matter. In one embodiment, construe two tenants named as tenant A 202 and tenant B 204 in an organization. The system 102 may create a namespace 1 for the tenant A 202 and a namespace 2 for the tenant B 204. The namespace 1 may be referred as an instance 1, and the namespace 2 may be referred as an instance 2.

Further, the system 102 may perform a second layer isolation in the instance 1 and the instance 2. Based on the second layer isolation, the system 102 may generate a tenant 206 and a tenant 208 in the instance 1. The tenant 206 may be related to cyber security and the tenant 208 may be related to HR. Further, the system 102 may generate a tenant 210 and the tenant 212.

Figure 3:
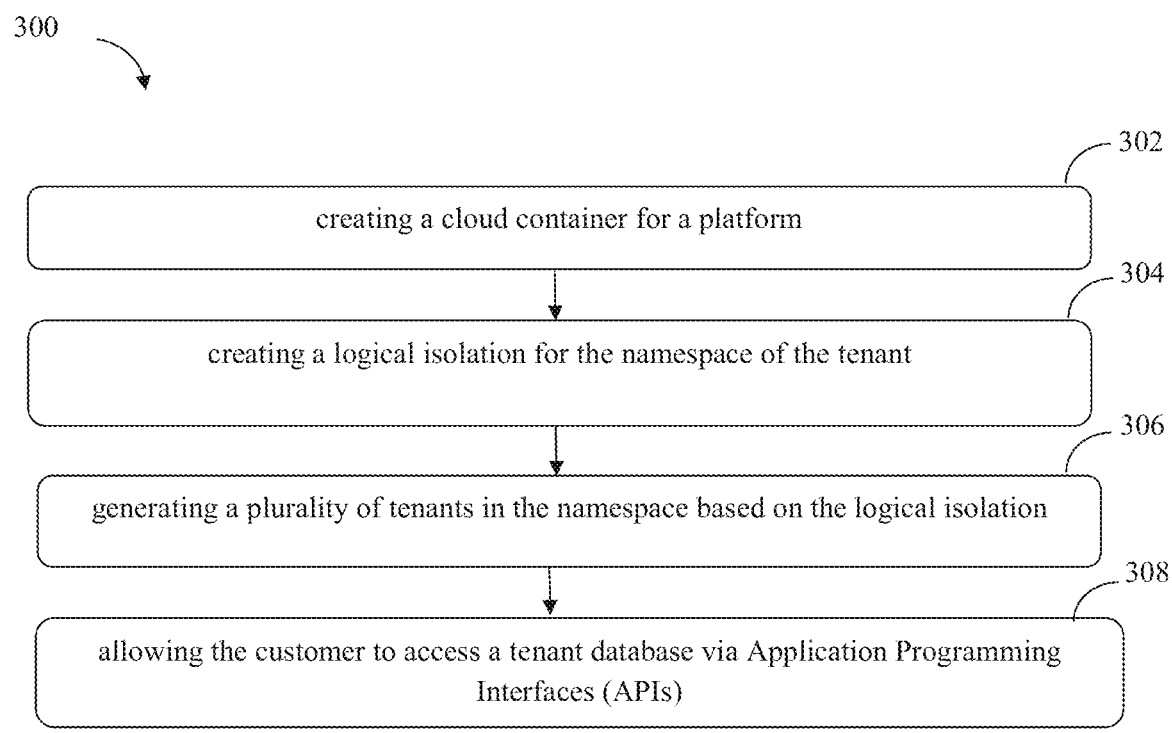
FIG. 3 illustrates a method for creating a layered multi-tenant, in accordance with an embodiment of the present subject matter.

Referring now to FIG. 3, a method 300 for creating a layered multi-tenancy architecture is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types.

The order in which the method 300 is described is not intended to be construed as a limitation, and any number of the described method blocks can be combined in any order to implement the method 300 or alternate methods for creating a layered multi-tenancy. Additionally, individual blocks may be deleted from the method 300 without departing from the spirit and scope of the subject matter described herein. Furthermore, the method 300 for creating a layered multi-tenancy architecture can be implemented in any suitable hardware, software, firmware, or combination thereof. However, for ease of explanation, in the embodiments described below, the method 300 may be considered to be implemented in the above described system 102.

At block 302, a cloud container for a platform may be created. In one embodiment, the cloud container may comprise a namespace for a tenant from a set of tenants accessing the platform. The namespace may be created using a Container as a Service (CaaS) platform. The namespace indicates a first layer isolation for the set of tenants.

At block 304, a logical isolation for the namespace of the tenant may be created. In one embodiment, the logical isolation may be at a database layer. The logical isolation may be a n-to-n segregation of the namespace.

At block 306, a plurality of tenants in the namespace may be generated based on the logical isolation. In one embodiment, the plurality of tenants may be generated based on business units in the platform.

At block 308, the tenants may be allowed to access a tenant database via Application Programming Interfaces (APIs). In one embodiment, the access is performed using a web token. The web token may comprise a customer identity and a customer role. The APIs may parse the web token to validate each tenant from the set of tenants, thereby creating a layered multi-tenant.

Exemplary embodiments discussed above may provide certain advantages. Though not required to practice aspects of the disclosure, these advantages may include those provided by the following features.

Some embodiments of the system and the method comprises a portable multi-tenancy architecture.

Some embodiments of the system and the method enable a second layer isolation in a namespace of a customer.

Some embodiments of the system and the method enable allowing the customer to access tenants based on a role of the customer in an organization.

Although implementations for methods and system for creating a layered multi-tenancy architecture have been described in language specific to structural features and/or methods, it is to be understood that the appended claims are not necessarily limited to the specific features or methods described. Rather, the specific features and methods are disclosed as examples of implementations for creating a layered multi-tenancy architecture.

The invention claimed is:

1. A method to create a layered multi-tenant architecture, the method comprising:
   creating, by a processor, a cloud container for a platform, wherein the cloud container comprises a namespace for a tenant from a set of tenants accessing the platform, wherein the namespace is created using a Container Orchestration and wherein the namespace indicates a first layer isolation for the set of tenants;
   creating, by the processor, a second logical isolation for the namespace of the tenant, wherein the second logical isolation is at a database layer, and wherein the second logical isolation is a n-to-n segregation of the namespace and wherein the n-to-n segregation of the namespace indicates 'n' number of tenants per customer along with 'n' number of customers in the container orchestration creating layered multi-tenancy or multi-tenancy squared;
   generating, by the processor, a plurality of tenants in the namespace based on the second logical isolation, wherein the plurality of tenants is further segregated based on business units in the platform and wherein each tenant is configured with a customer, Application Programming Interfaces (APIs), modules, configurations, and a role-based access control for the tenants; and
   allowing, by the processor, the tenant to access a single tenant database via the APIs, wherein the access is performed using a web token, and wherein the web token comprises a customer identity and a customer role, and wherein the APIs parses the web token to validate each tenant from the set of tenants, thereby creating a layered multi-tenant architecture.

2. The method as claimed in claim 1, comprises running multiple load-balanced instances within the Container Orchestration.

3. The method as claimed in claim 1, comprises allowing the tenant to access the single tenant database based on a second layer of tenant isolation.

4. The method as claimed in claim 1, comprises rollup of metrics and Key Performance Indicators (KPIs) across the plurality of tenants.

5. A system for creating a layered multi-tenant architecture, the system comprising:
   a memory;
   a processor coupled to the memory, wherein the processor is configured to execute a set of instructions stored in the memory to:
   create a cloud container for a platform, wherein the cloud container comprises a namespace for a tenant from a set of tenants accessing the platform, wherein the namespace is created using a Container Orchestration, and wherein the namespace indicates a first layer isolation for the set of tenants;
   create a second logical isolation for the namespace of the tenant, wherein the second logical isolation is at a database layer, and wherein the second logical isolation is a n-to-n segregation of the namespace and wherein the n-to-n segregation of the namespace indicates 'n' number of tenants per customer along with 'n' number of customers in the Container Orchestration creating layered multi-tenancy or multi-tenancy squared;

generate a plurality of tenants in the namespace based on the second logical isolation, wherein the plurality of tenants is further segregated based on business units in the platform and wherein each tenant is configured with a customer, Application Programming interfaces (APIs), modules, configurations, integration, and a role-based access control for the tenants; and allow the tenant to access a single tenant database via the APIs, wherein the access is performed using a web token, and wherein the web token comprises a customer identity and a customer role, and wherein the APIs parses the web token to validate each tenant from the set of tenants, thereby creating a layered multi-tenant architecture.

6. The system as claimed in claim 5, comprises running a multiple load-balanced instances within the Container Orchestration.

7. The system as claimed in claim 5, comprises allowing the tenant to access the single tenant database based on a second layer of tenant isolation.

8. The system as claimed in claim 5, configured to rollup metrics and Key Performance Indicators (KPIs) across the plurality of tenants.

9. A non-transitory computer program product having embodied thereon a computer program for creating a layered multi-tenant architecture, the computer program product storing instructions, the instructions comprising instructions for:

creating a cloud container for a platform, wherein the cloud container comprises a namespace for a tenant from a set of tenants accessing the platform, wherein the namespace is created using a Container Orchestration, and wherein the namespace indicates a first layer isolation for the set of tenants;

creating a second logical isolation for the namespace of the tenant, wherein the second logical isolation is at a database layer, and wherein the second logical isolation is a n-to-n segregation of the namespace and wherein the n-to-n segregation of the namespace indicates 'n' number of tenants per customer along with 'n' number of customers in the container orchestration creating layered multi-tenancy or multi-tenancy squared;

generating a plurality of tenants in the namespace based on the second logical isolation, wherein the plurality of tenants is further segregated based on business units in the platform and wherein each tenant is configured with a customer, Application Programming Interfaces (APIs), modules, configurations, and a role based access control for the tenants; and allowing the tenant to access a single tenant database via the APIs, wherein the access is performed using a web token, and wherein the web token comprises a customer identity and a customer role, and wherein the APIs parses the web token to validate each tenant from the set of tenants, thereby creating a layered multi-tenant architecture.

\* \* \* \* \*